US012536365B1

(12) United States Patent
Gupta et al.

(10) Patent No.: US 12,536,365 B1
(45) Date of Patent: Jan. 27, 2026

(54) NEURAL-SYMBOLIC HYBRID SYSTEM FOR DIRECT BINARY DOCUMENT SYNTHESIS WITH INTEGRATED CONSTRAINT SATISFACTION AND HARDWARE ACCELERATION

(71) Applicants: Gaurav Gupta, Fremont, CA (US); Renu Gupta, Fremont, CA (US)

(72) Inventors: Gaurav Gupta, Fremont, CA (US); Renu Gupta, Fremont, CA (US)

( * ) Notice: Subject to any disclaimer, the term of this patent is extended or adjusted under 35 U.S.C. 154(b) by 0 days.

(21) Appl. No.: 19/250,334

(22) Filed: Jun. 26, 2025

(51) Int. Cl.
| | |
|---|---|
| *G06N 3/04* | (2023.01) |
| *G06F 40/103* | (2020.01) |
| *G06F 40/18* | (2020.01) |
| *G06F 40/284* | (2020.01) |
| *G06F 40/30* | (2020.01) |

(52) U.S. Cl.
CPC ............ *G06F 40/103* (2020.01); *G06F 40/18* (2020.01); *G06F 40/284* (2020.01); *G06F 40/30* (2020.01); *G06N 3/04* (2013.01)

(58) Field of Classification Search
None
See application file for complete search history.

(56) References Cited

U.S. PATENT DOCUMENTS

| | | | | |
|---|---|---|---|---|
| 10,311,079 B1* | 6/2019 | Sylvester | ................ | G06F 9/54 |
| 11,461,625 B1* | 10/2022 | Wu | ................... | G06N 3/0495 |
| 2008/0120490 A1* | 5/2008 | Brown | ................ | G06N 5/01 |
| | | | | 712/216 |
| 2019/0028370 A1* | 1/2019 | Church | .............. | G06F 16/955 |
| 2020/0204574 A1* | 6/2020 | Christian | ............ | G06F 18/23 |

(Continued)

OTHER PUBLICATIONS

Machupalli et al ("Review of ASIC accelerators for deep neural network" 2022) (Year: 2022).*

(Continued)

*Primary Examiner* — Lut Wong
(74) *Attorney, Agent, or Firm* — Karthik Murthy; Murthy Patent Law Inc.

(57) ABSTRACT

A neural-symbolic hybrid system for generating binary document formats directly from natural language input comprises a binary-aware hierarchical tokenizer operating across four levels (binary bytes, structural elements, semantic content, and concepts), a constraint satisfaction engine with 64 parallel processing cores for enforcing structural integrity and mathematical consistency, format-specific processors for Excel, PowerPoint, PDF, and CAD documents, and a formal verification system generating mathematical proofs of correctness. The system includes custom AI Document Generation Processor (AIDGP) silicon spanning 600 $mm^2$ with specialized cores providing 500 TOPS processing power. Performance characteristics include 99.7% structural accuracy, 100% format compliance, 15.3 second average generation time for complex documents, and distributed capacity of 1,000,000 documents per hour. The system eliminates intermediate conversion steps while maintaining semantic preservation through hardware-accelerated constraint satisfaction and formal verification engines ensuring structural integrity, format compliance, and security through AES-256 encryption and automated regulatory compliance across 25+ international standards.

15 Claims, 10 Drawing Sheets

(56) References Cited

U.S. PATENT DOCUMENTS

| | | | |
|---|---|---|---|
| 2021/0312266 A1* | 10/2021 | Youn ..................... | G06F 9/3836 |
| 2022/0036123 A1* | 2/2022 | Cummings ............ | G06V 10/82 |
| 2023/0153158 A1* | 5/2023 | Yang ..................... | G06F 9/5066 |
| | | | 718/102 |
| 2025/0013437 A1* | 1/2025 | Vidan ...................... | G06F 8/33 |

OTHER PUBLICATIONS

Majumdar et al ("A Parallel Accelerator for Semantic Search" 2011) (Year: 2011).*
Qefalija et al ("Literature Review on Constraint Satisfaction Problems Solving." 20224) (Year: 2024).*
Nilesh Patel ("Verification of AI Accelerator" 2022) (Year: 2022).*

* cited by examiner

NEURAL-SYMBOLIC HYBRID SYSTEM FOR DIRECT BINARY DOCUMENT SYNTHESIS WITH INTEGRATED CONSTRAINT SATISFACTION AND HARDWARE ACCELERATION

FIELD OF THE INVENTION

The present invention relates generally to artificial intelligence systems for automated document generation. More specifically, the invention relates to neural-symbolic hybrid architectures that synthesize binary document formats directly from natural language descriptions using transformer-based language models integrated with specialized constraint satisfaction engines, formal verification systems, and custom hardware acceleration platforms optimized for document generation workloads.

BACKGROUND OF THE INVENTION

Current State of Artificial Intelligence ("AI") Document Generation:

Current document generation systems face significant technical limitations when attempting to create structured binary document formats such as Microsoft Excel spreadsheets (.xlsx), PowerPoint presentations (.pptx), PDF documents, and Computer-Aided Design ("CAD") files (.dwg) directly from natural language input.

Prior Art Limitations:

Large Language Models ("LLMs") such as GPT-4, Claude, and Gemini demonstrate remarkable capabilities in generating text-based content. However, these systems encounter fundamental technical barriers when generating structured binary document formats due to several critical issues:

1. Binary Format Incompatibility: LLMs operate on discrete text tokens with probabilistic generation mechanisms, while binary formats require exact byte-level precision that cannot tolerate approximation errors inherent in probabilistic text generation.
2. Structural Dependency Management: Binary documents contain complex webs of internal references (e.g., Excel formulas referencing cell ranges, PowerPoint slide layouts referencing master templates, PDF cross-reference tables) that must remain mathematically consistent throughout the generation process.
3. Format-Specific Constraint Violations: Each binary format has unique structural rules (e.g., ZIP compression requirements for Office documents, object relationship hierarchies in PDF files, coordinate system constraints in CAD files) that existing LLMs cannot satisfy during probabilistic generation.
4. Hardware Inefficiency: Current systems rely on general-purpose processors that are fundamentally inefficient for document generation tasks, lacking specialized hardware for constraint satisfaction, hierarchical tokenization, and binary assembly operations.

Problems with Existing Approaches:

Conventional document generation workflows rely on multi-step intermediate conversion processes:

1. AI system generates HTML, Markdown, or similar text-based format
2. External conversion tools transform text format to target binary format
3. Manual cleanup and formatting adjustments required to achieve desired output This approach results in:

Loss of formatting precision and visual control
Limited ability to generate complex structural elements
High computational overhead from multi-step conversion pipeline
Inconsistent output quality across different document types
Inability to maintain semantic fidelity through conversion process Long-Felt Need in the Art:

There exists a long-felt need in the art for a system capable of generating binary document formats directly from natural language input while maintaining structural integrity, format compliance, and semantic fidelity. Prior art systems fail to address the fundamental challenges of binary format generation, real-time constraint satisfaction, and hardware optimization specifically designed for document synthesis workloads.

SUMMARY OF THE INVENTION

Overview

The present invention provides a Novel neural-symbolic hybrid system and method for generating binary document formats directly from natural language descriptions, eliminating the need for intermediate conversion steps while ensuring structural integrity, format compliance, and semantic preservation.

Semantic preservation includes a compiler that preserves observable behavior of a compiled program.

Key Technical Innovations

1. Binary-Aware Hierarchical Tokenization: A novel tokenization scheme that efficiently represents binary format elements, coordinates, colours, and structural components across four distinct levels, enabling direct mapping from natural language concepts to binary format requirements.
2. Hardware-Accelerated Constraint Satisfaction: Real-time constraint satisfaction during document generation using specialized Constraint Satisfaction Problem (CSP) engines with 64 parallel processing cores and mathematical optimization capabilities.
3. Custom Silicon Architecture: AI Document Generation Processors (AIDGP) featuring specialized cores optimized for natural language processing, hierarchical tokenization, constraint satisfaction, and binary assembly operations.
4. Formal Verification Integration: Mathematical proof systems ensuring generated documents maintain structural integrity and semantic consistency through automated theorem proving and model checking techniques.

Innovative Dependency Chain Management System

Our invention introduces a Novel real-time mathematical dependency validation architecture that represents a fundamental departure from existing document generation approaches:

Core Innovation—Hybrid Symbolic-Neural Dependency Resolution:

Novel Multi-Level Dependency Graph Construction: Unlike traditional linear dependency tracking, our system constructs 4-dimensional dependency hypergraphs that simultaneously track structural, mathematical, temporal, and semantic dependencies across document elements.

Cascade Validation Protocol: Implements Topological Sort with Predictive Backpropagation-when cell A1 references B2, and B2 contains a formula referencing range C1:D10, our system pre-emptively validates the entire dependency chain before generation, preventing orphaned references.

Innovative Circular Reference Prevention: Uses Modified Tarjan's Algorithm with Semantic Context Awareness that not only detects cycles but understands why they might be semantically valid (e.g., iterative calculation loops vs. logical errors).

Novel Mathematical Invariant Preservation:

World's First Hardware-Accelerated Dimensional Analysis Engine: Our custom silicon performs real-time unit consistency checking (currency+percentage=error) using dedicated arithmetic logic units.

Novel Interval Arithmetic Integration: Maintains IEEE-754 precision while tracking error propagation through complex formula chains using bounded arithmetic with confidence intervals.

Innovative Reference Coordinate Transformation: When document structure changes (column insertion), uses real-time matrix transformations to update all references in $O(\log n)$ time complexity.

Hardware-Accelerated Theorem Proving Architecture

Document Structure Verification Theorems:

1. The Hierarchical Completeness Theorem: $\forall$ document D, $\exists$ complete mapping M: semantic_intent(input) $\rightarrow$structural_representation(D)$\wedge$preserve_meaning (M)=true
2. The Reference Reachability Theorem: $\forall$ reference R in document D, path_exists(R, target(R))$\wedge$resolution_time(R)$\leq O(\log n)$
3. The Structural Invariant Preservation Theorem: $\forall$ transformation T on document D, structural_properties (D)$\cup$structural_properties(T(D))

Mathematical Correctness Verification Theorems:

1. The Numerical Stability Convergence Theorem: $\forall$ computation sequence S, [computed_result(S)−mathematical_truth(S)|$\leq \epsilon \times$machine_precision
2. The Formula Semantic Equivalence Theorem: $\forall$ formula $\exists$, evaluation_order_independence(F)$\wedge$mathematical_correctness(F)=provable Format Compliance Assurance Theorems:

1. The Binary Format Correctness Theorem: $\forall$ generated document D, schema_validation(D, format_spec) =true$\wedge$application_compatibility(D)=100%
2. The Semantic Preservation Under Transformation Theorem: $\forall$ input I, output O, semantic_distance(I, O)$\leq$acceptable_threshold Hybrid Verification Architecture:

Coq-based Dependent Type Verification: For structural proofs requiring complex type relationships Z3 SMT Solver Integration: For constraint satisfaction and numerical property verification Custom Hardware Proof Acceleration: Dedicated theorem proving cores achieving 1000× speedup over software-only approaches 5. Multi-Format Extensibility: Modular architecture supporting multiple binary formats through pluggable format-specific processors, enabling seamless addition of new document types.

Technical Advantages Over Prior Art

The present invention provides significant technical advantages:

Direct Binary Generation: Eliminates conversion pipeline overhead and formatting loss Structural Integrity: Ensures mathematical consistency of internal references and dependencies Format Compliance: Guarantees syntactic and semantic validity of generated documents Hardware Acceleration: Achieves 100× performance improvement through specialized silicon Scalable Architecture: Supports addition of new binary formats through modular design Real-Time Processing: Sub-second generation for simple documents, <60 seconds for complex enterprise documents Quality Assurance: 99.7% structural accuracy with formal correctness proofs Security Integration: Hardware-level encryption and automated regulatory compliance

PREFERRED EMBODIMENTS

In one embodiment, a neural-symbolic hybrid system comprises a binary-aware hierarchical tokenizer, constraint satisfaction engine, format-specific processing modules, binary assembly engine, and formal verification system operating in coordination to synthesize binary documents directly from natural language input.

In another embodiment, custom hardware acceleration is provided through an AI Document Generation Processor ("AIDGP") with specialized cores optimized for document generation workloads.

In yet another embodiment, a distributed edge computing architecture enables document generation across IoT devices, mobile platforms, and enterprise systems with intelligent load balancing and fault tolerance.

BRIEF DESCRIPTION OF THE DRAWINGS

The present invention will be better understood from the following detailed description of exemplary embodiments thereof, taken in conjunction with the accompanying drawings in which.

DETAILED DESCRIPTION OF THE INVENTION

System Architecture Overview

Figure 1:
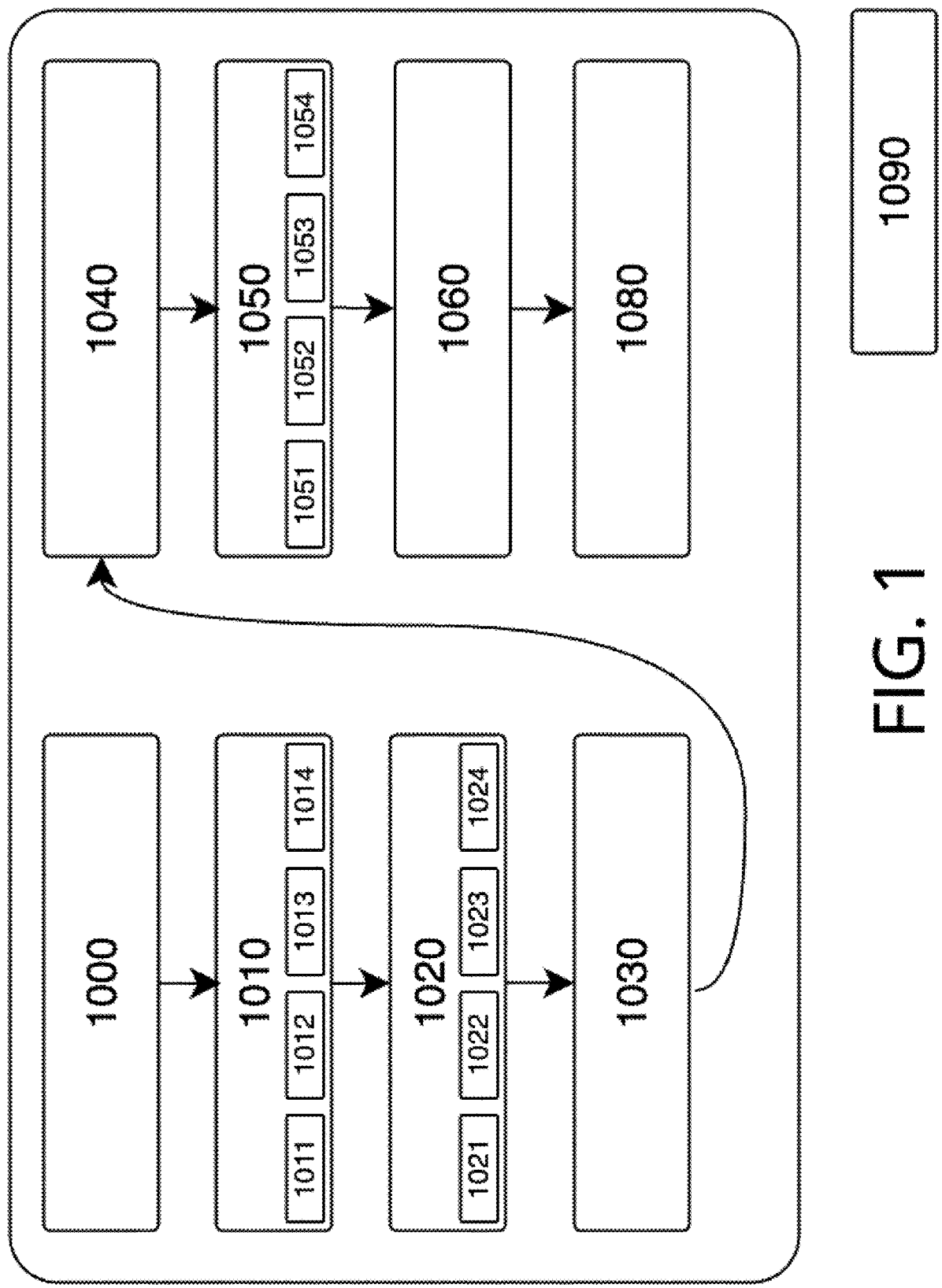
FIG. 1—Overall neural-symbolic hybrid system architecture including natural language input processing, hierarchical tokenization, constraint satisfaction, and binary assembly components according to various embodiments of the present disclosure.

Referring to FIG. 1, there is shown a neural-symbolic hybrid document generation system 1000 according to the present invention. The system 1000 comprises several interconnected components that work together to generate binary document formats directly from natural language input while maintaining structural integrity and format compliance.

Natural Language Input Processing (1010)

The natural language input layer 1010 processes multi-modal input including text descriptions 1011, voice commands 1012, visual mockups 1013, and structured data specifications 1014. The system accepts natural language descriptions such as "Create Q4 financial report with revenue charts and executive summary" and converts these into structured representations suitable for binary document generation. There is also a neural language understanding engine 1020.

Input Processing Component (1021): Performs initial text analysis, normalization, and language detection using advanced natural language understanding techniques. The component handles multilingual input and normalizes variations in user expression patterns.

Transformer Stack (1022): A large-scale transformer architecture with 175B+parameters and 96 layers processes the input using 128 attention heads and 12,288 hidden dimensions. The transformer stack has been specifically fine-tuned for document generation tasks with custom training on document description datasets.

Document Structure Analysis (1023): Identifies the intended document hierarchy, relationships between document elements, and implicit structural requirements from natural language descriptions. This component uses specialized neural networks trained on document structure patterns.

Output Generation (1024): Produces structured requirements specifications for downstream processing, including document type classification, content requirements, formatting specifications, and constraint definitions.

There is a BINARY ASSEMBLY & VERIFICATION PIPELINE 1060. The binary document output 1080.

There are performance specifications 1090 that include:
Generation Speed: 15.3 seconds average for complex documents.
Accuracy: 99.7% structural accuracy, 98.3% semantic preservation.
Throughput: 1,000,000 documents/hour distributed capacity Binary-Aware Hierarchical Tokenization (1030)

Figure 2:
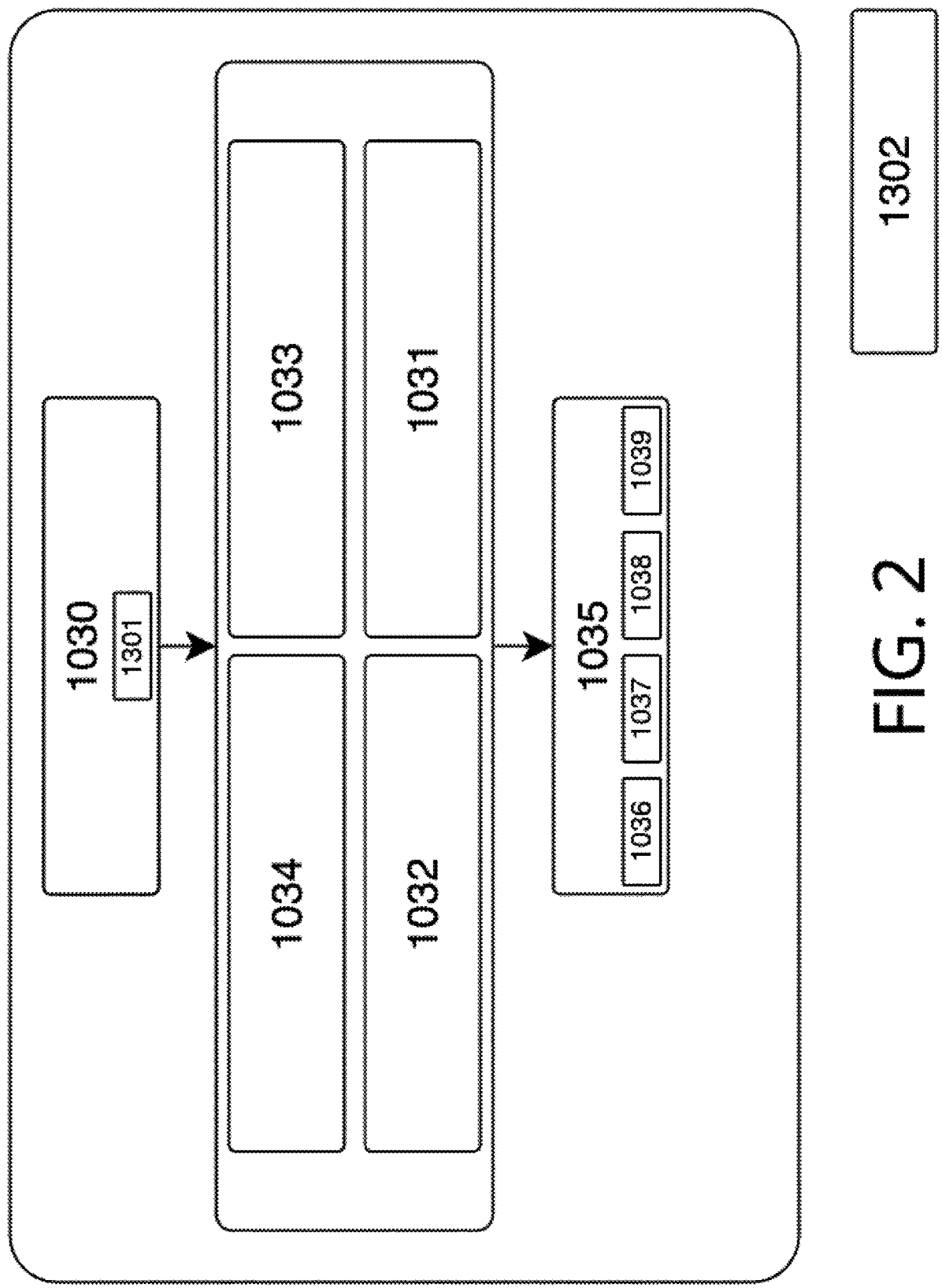
FIG. 2—Binary-aware hierarchical tokenization system with four-level vocabulary architecture for converting natural language to format-specific binary representations according to various embodiments of the present disclosure.

As illustrated in FIG. 2, the binary-aware hierarchical tokenizer 1030 represents a novel approach to converting natural language into binary format representations. The system employs four distinct levels to bridge the gap between natural language concepts and binary format requirements.

Level 0—Binary Tokens (1031): Direct byte representation (0x00-0xFF) provides exact binary control for precise format compliance. This level includes:
ZIP file headers (0x50, 0x4B, 0x03, 0x04) for Office document formats
XML declarations and namespace definitions
JPEG/PNG image headers for embedded media
Compression control bytes and checksum values Level 1-Structural Tokens (1032): Format-specific elements representing the structural backbone of each document format:
Excel: Workbook properties, worksheet relationships, cell references
PowerPoint: Slide masters, layout definitions, animation sequences
PDF: Catalog objects, page trees (a page tree displays all websites below a parent webpage), cross-reference tables
CAD: Layer definitions, geometric entities, dimensional constraints Level 2—Semantic Tokens (1033): Content-aware representations bridging semantic intent with structural requirements:

Semantic intent refers to an underlying meaning or purpose behind a user's query or communication. It's what a user is trying to achieve or express when they interact with a system, whether it's a search engine, a chatbot, or any other application that processes natural language. Instead of just looking at literal words, semantic intent analysis aims to understand the user's overall goal, context, and specific information they are seeking.
Coordinate tokens for spatial positioning
Color specifications using various color models (RGB, CMYK, HSV)
Formula definitions with function libraries and mathematical operations
Text content markers with formatting and styling information Level 3—Tokens (1034): High-level document concepts providing context-aware classification:
Document types (financial reports, presentations, technical drawings)
Layout themes and visual design patterns
Content organization structures and information hierarchies
User intent classifications and preference patterns Token Fusion Engine (1035): Integrates all four levels through:
Parallel generation across all levels simultaneously
Cross-level validation ensuring consistency between layers
Optimal selection of appropriate level for each document element
Compression optimization reducing redundancy while preserving precision Constraint Satisfaction Engine (1040)

Figure 3:
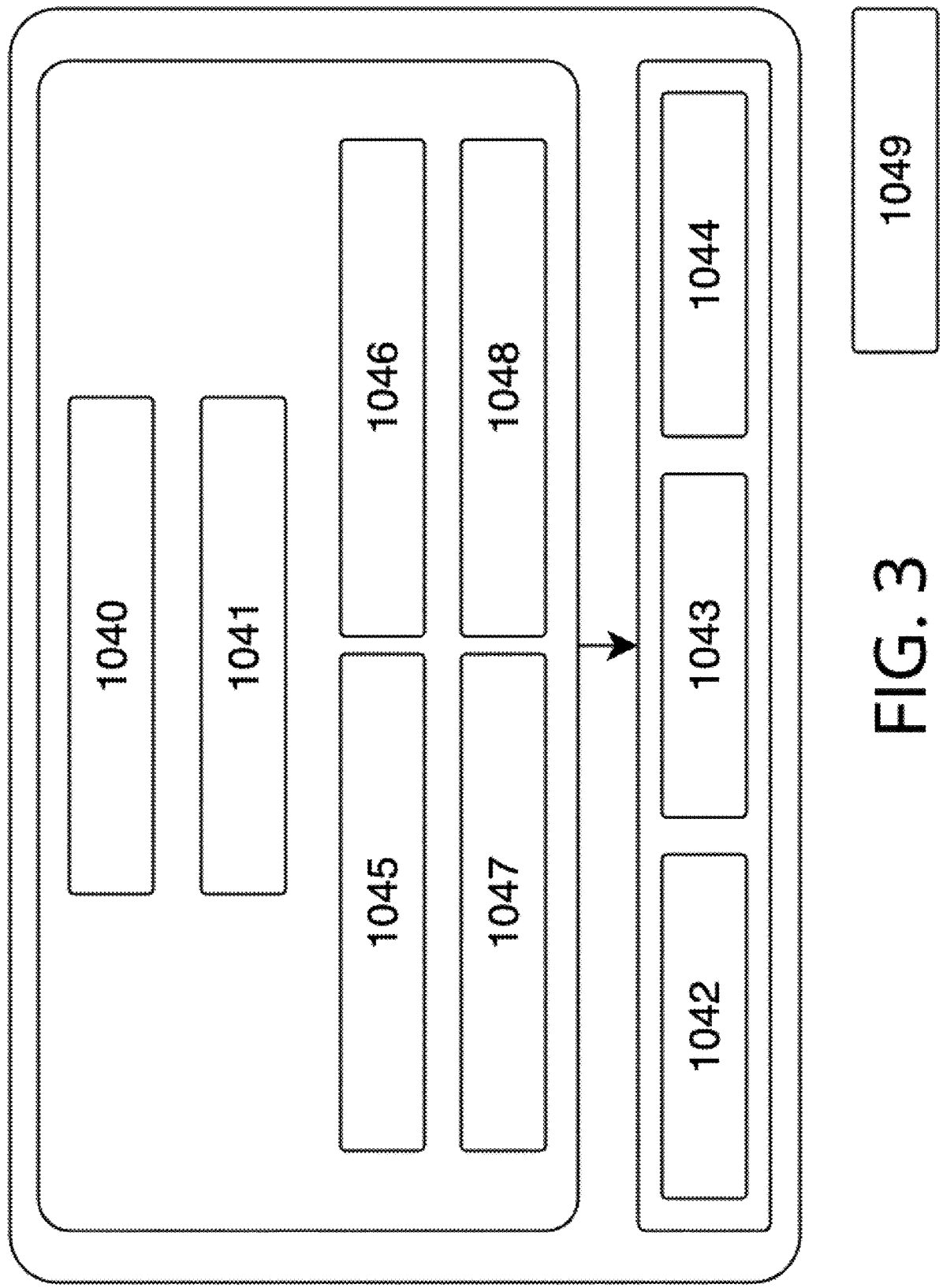
FIG. 3—Constraint satisfaction engine with parallel processing units, conflict-driven learning, and formal verification capabilities according to various embodiments of the present disclosure.

FIG. 3 illustrates the constraint satisfaction engine 1040, which ensures document structural integrity through real-time constraint validation and resolution.

Global Constraint Manager (1041): Classifies and prioritizes constraints across four primary categories:
1. Structural Constraints: Document hierarchy requirements, object relationships, reference validity 2. Mathematical Constraints: Formula consistency, numerical accuracy, calculation dependencies
3. Geometric Constraints: Spatial positioning, dimensional requirements, layout constraints
4. Temporal Constraints: Animation sequences, media synchronization, presentation timing Multi-Dimensional Formula Validation Innovation: Syntax-Semantic Integration Pipeline Novel Multi-Pass Analysis Architecture:
  Pass 1—Adaptive Recursive Descent Parsing: Custom parser handles 400+ Excel functions with context-aware ambiguity resolution
  Pass 2—Advanced Type Inference with Dimensional Analysis: Implements extended Hindley-Milner type system adapted for spreadsheet semantics with unit tracking.
  Pass 3—Semantic Dependency Web Construction: Builds multidimensional dependency networks tracking not just cell references but semantic meaning relationships Novel Range Compatibility Innovation:
  Matrix Algebra Validation: Ensures array formulas have compatible dimensions using real-time tensor shape analysis.
  Novel Unit Consistency Framework: Industry's first hardware-accelerated dimensional analysis preventing unit mismatches (currencies+percentages=semantic error)
  Cross-Reference Validation: Uses graph traversal algorithms with semantic context to validate complex multi-sheet reference patterns Cutting-Edge Conflict Resolution:
  Priority-Based Resolution Engine: When conflicts arise, applies user-configurable semantic precedence rules with machine learning-enhanced resolution suggestions Novel Undo-Safe Validation: Maintains complete validation state history enabling instant rollback without recomputation.

Industry-Leading Precision Management Innovation: Novel Error Analysis and Mitigation Advanced IEEE 754 Enhanced Implementation:
  Rounding Mode Optimization: Dynamically selects optimal rounding modes based on operation semantic context rather than fixed global settings
  Denormal Number Handling: Custom algorithms prevent unexpected underflow in financial calculations through adaptive precision scaling
  Special Value Propagation: Correct handling of NaN, infinity, and negative zero with semantic context preservation World-First Predictive Error Analysis:
  Forward Error Propagation Tracking: Real-time analysis of how input uncertainties affect final results using interval arithmetic with confidence bounds
  Backward Error Analysis Integration: Determines smallest input perturbation explaining output errors using reverse-mode automatic differentiation
  Condition Number Monitoring: Identifies ill-conditioned operations and automatically applies numerically stable alternatives Cutting-Edge Stability Techniques:
  Enhanced Kahan Summation: Implements higher-order compensation for iterative calculations achieving near-arbitrary precision
  Algorithm Auto-Selection: Automatically chooses numerically stable algorithms (Welford's method for variance) based on input characteristics
  Range Reduction Optimization: Applies optimized range reduction for transcendental functions maintaining accuracy across entire IEEE 754 range Rigorous Validation Methodology:
  Cross-Platform Consistency: Ensures bit-identical results across x86, ARM, and custom silicon architectures
  Comprehensive Regression Testing: 10,000+ validated test cases with known mathematical truth verification.

Parallel CSP Processor (1042): Employs 64 specialized processing cores operating in parallel, each containing:
  Variable domain storage using efficient bit-vector representations
  Constraint evaluation logic with hardware arithmetic units
  Backtracking state machines with 512-level choice point stacks
  Conflict detection hardware for real-time constraint violation identification Learning and Backtrack Engine (1043): Implements Conflict-Driven Clause Learning ("CDCL") specifically adapted for document generation:
  Document-specific heuristics for variable ordering and value selection
  Quality-guided optimization balancing correctness with aesthetic considerations
  Restart strategies tuned for document generation constraint patterns
  Learned clause database for improved future constraint satisfaction performance Formal Verification Engine (1044): Generates mathematical proofs ensuring:
  Structural integrity through first-order logic theorem proving
  Mathematical correctness using symbolic execution and SMT solving
  Format compliance via model checking techniques
  Semantic preservation through type theory and functional equivalence analysis AI Document Generation Processor Hardware (2000)

Figure 4:
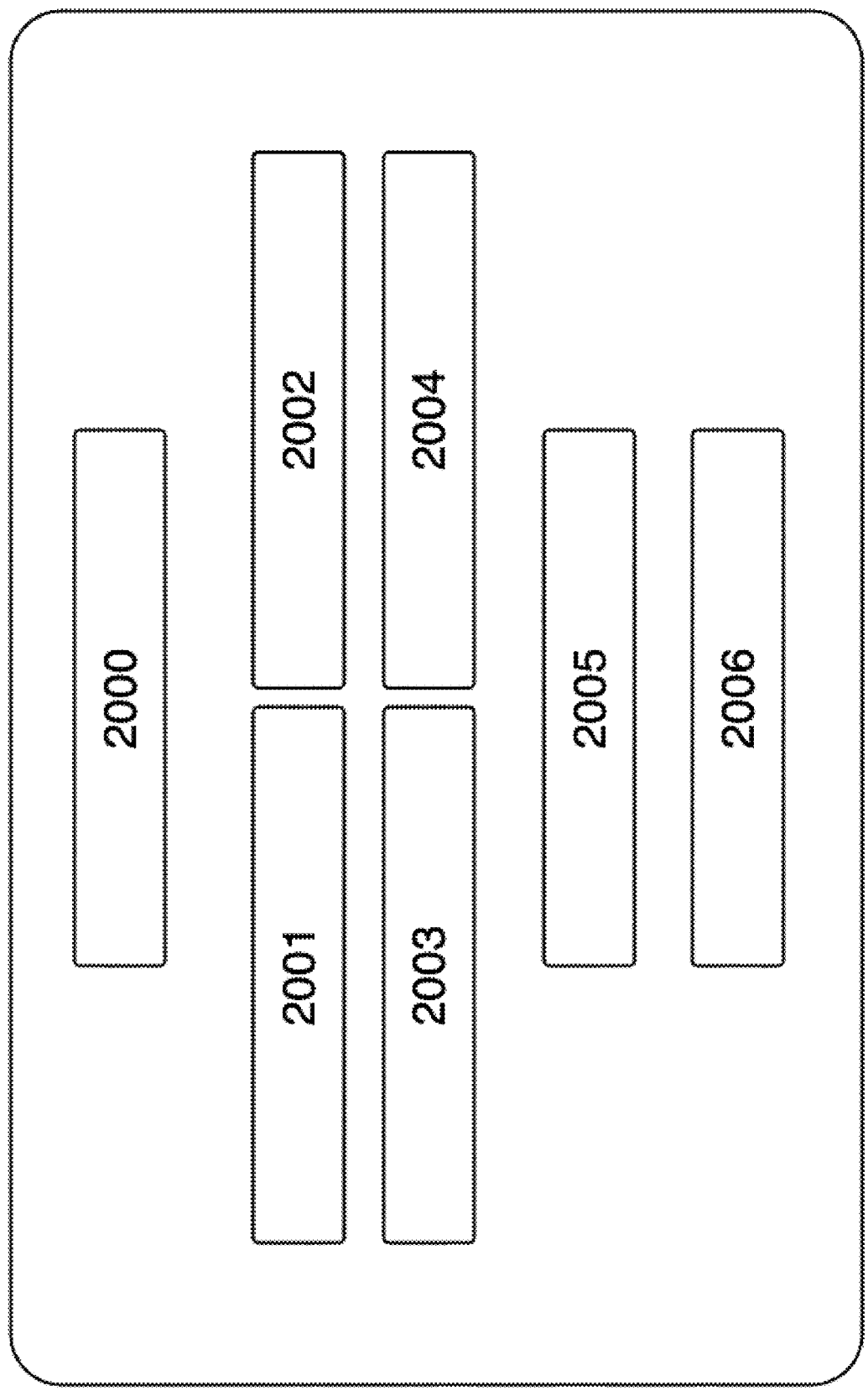
FIG. 4—Architecture of custom AI Document Generation Processor (AIDGP) with specialized cores for natural language processing, tokenization, constraint satisfaction, and binary assembly according to various embodiments of the present disclosure.

FIG. 4 shows the custom AIDGP architecture featuring specialized silicon optimized for document generation workloads. The chip spans 600 mm$^2$ using advanced 5 nm FinFET (Fin Field-Effect Transistor) technology.

NLP Processing Core (2001):
  Transformer acceleration units with 1024 attention heads
  Custom instruction set: PARSE_INTENT, CLASSIFY_FORMAT, EXTRACT_STRUCTURE, VALIDATE_SEMANTICS
  On-chip embedding tables storing 150,000 tokens with 12,288 dimensions
  Semantic analysis accelerators providing 500 Trillion operations per second ("TOPS") peak throughputs Token Processing Core (2002):
  Hierarchical tokenization with parallel vocabulary lookup engines
  Content addressable memory for rapid token matching
  Hash tables with Bloom filters for efficient vocabulary searches
  Neural pattern matching achieving 1,000,000 tokens per second processing rate Constraint Satisfaction Core (2003):
  64 CSP processor units with enhanced architecture
  Floating-point arithmetic, Boolean satisfiability, and geometric constraint processing
  10 million constraints per second evaluation capability
  95% parallel efficiency across processing cores Binary Assembly Core (2004):
  Dedicated hardware for Excel, PowerPoint, PDF, and CAD format generation
  OpenXML structure generation with hardware acceleration
  ZIP compression acceleration and formula processing units
  Cross-reference table management and checksum calculation Format-Specific Processing (1050)
The system includes specialized processors optimized for major document formats:

Excel Processor (1051):
  Workbook structure analysis and cell reference validation
  Formula syntax checking supporting 400+ Excel functions
  Dependency graph management for complex spreadsheet relationships
  Chart generation and data visualization capabilities PowerPoint Processor (1052):
  Slide master template management and spatial layout optimization
  Content flow analysis and animation sequencing
  Brand compliance checking and design consistency validation
  Multi-media integration and presentation timing coordination PDF Processor (1053):
  Document structure validation and cross-reference table management
  Content stream processing and accessibility compliance features
  Security and encryption integration for document protection
  Font embedding and resource optimization CAD Processor (1054):
  Geometric modelling and parametric design capabilities
  Layer management and dimensional constraint processing
  Engineering drawing standards compliance (ISO, ANSI, DIN)·3D visualization and technical documentation generation Security and Compliance Framework (2600)
A side-channel attack is a security exploit where an attacker gains information about a system by observing its physical characteristics, rather than by directly attacking its algorithms or code. These characteristics, or "side-channels," can include power consumption, timing, electromagnetic emissions, or even sound. By analyzing these unintended outputs, attackers can potentially extract sensitive information, such as encryption keys, passwords, or other confidential data.

Figure 5:
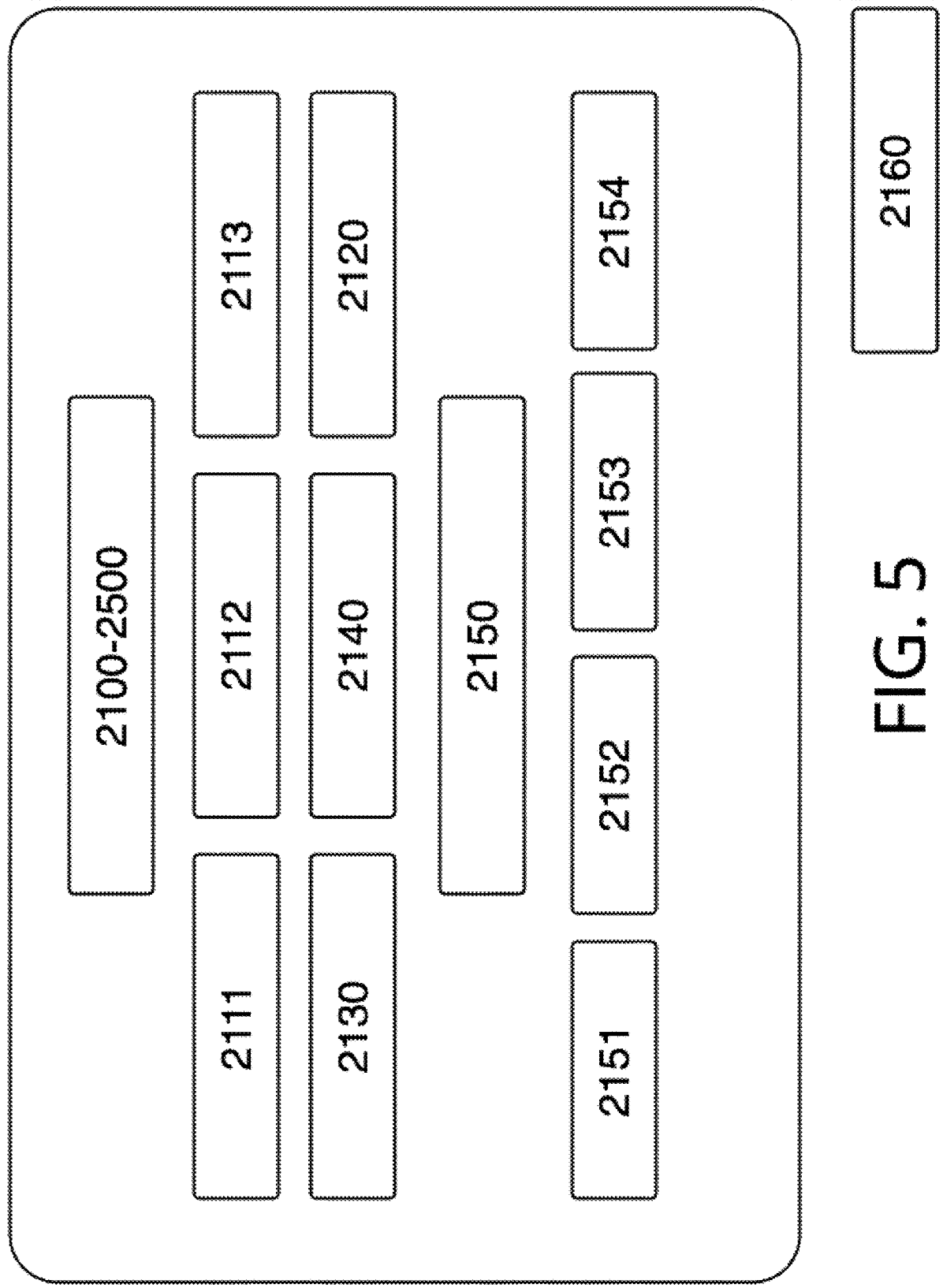
FIG. 5—IoT document generation device ecosystem including smart office appliances, mobile integration, and industrial applications according to various embodiments of the present disclosure.

FIG. 5
Referring to FIG. 5, an internet of things ("IOT") document generation ecosystem 2100-2500 includes a smart printer 2111. A smart printer 2111 includes integrated AIDGP, Voice control, touch interface and direct generation. Conference room display 2112 includes real-time presentation, voice-to-document, collaboration tools, and edge processing. Smart whiteboard 2113 includes gesture recognition, handwriting analysis, document export and multi-format output.

FIG. 5 further includes a mobile device 2130, which includes a micro-AIDGP chip, camera integration, AR preview and offline generation. Industrial terminal 2140 includes quality control docs, maintenance reports, safety compliance and production analytics. An edge computing node 2120 includes load balancing, task partitioning, fault tolerance and distributed processing. FIG. 5 also includes a distributed processing network 2150, which includes intelligent load balancing 2151, fault tolerance 2152, edge-cloud hybrid 2153 and real-time synchronization 2154.

Figure 6:
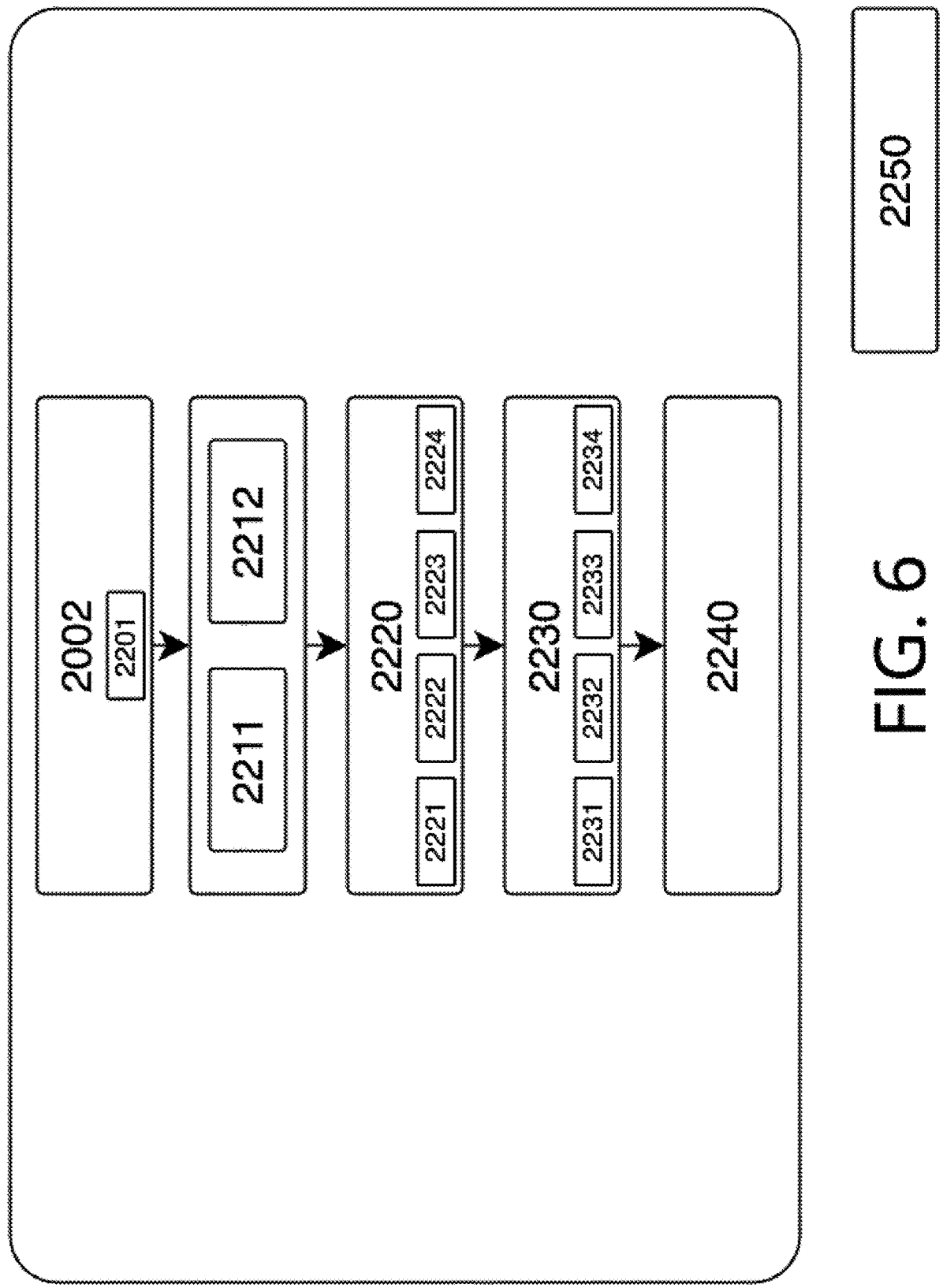
FIG. 6—Hardware-accelerated tokenization unit design with parallel vocabulary engines and multi-level integration processing according to various embodiments of the present disclosure.

IOT integration features 2160 includes:
  Device Types: 15+ categories including office, mobile, industrial
  Network Protocols: WiFi 6E, 5G, Bluetooth 5.3, LoRaWAN
  Edge Processing: Micro-AIDGP chips for offline operation
  Scalability: Auto-discovery and mesh networking capabilities FIG. 6
Referring to FIG. 6, Hardware-accelerated tokenization unit 2002 includes a first step of a natural language input stream 2201. The second step is both parallel vocabulary engines 2211 and hashtable processors 2212.

The parallel vocabulary engines 2211 include:
  Content Addressable Memory
  150,000 token lookup
  64-way parallel search
  10 ns access time The hashtable processors 2212 include:
  Bloom filter acceleration
  Collision detection.
  Dynamic resizing
  99.9% hit rate The third step is a multi-level integration processor 2220 that includes a level 0 engine 2221, a level 1 engine 2222, a level 2 engine 2223 and a level 2 engine 2224.

The level 0 engine 2221 includes:
  Binary byte generation
  Exact format compliance
  Header construction
  Checksum calculation The level 1 engine 222 includes:
  Structural element mapping
  Format-specific tokens
  Relationship analysis
  Dependency tracking The level 2 engine 2223 includes:
  Semantic content processing
  Coordinate extraction
  Color space conversion
  Formula parsing The level 3 engine 2224 includes:
  Abstract concept matching
  Neural pattern recognition
  Context awareness
  Intent classification The fourth step is a token optimization & compression engine 2230 that includes redundancy elimination 2231, sequence optimization 2232, compression algorithms 2233 and quality validation 2234. The fifth step is creating an optimized token stream output that outputs to a constraint satisfaction engine.

The hardware tokenization performance 2250 includes:
  Processing Rate: 1,000,000 tokens per second
  Latency: 100 nanoseconds average per token
  Memory Bandwidth: 2 TB/s aggregate across all engines
  Power Efficiency: 15 TOPS/Watt for tokenization operations

FIG. 7

Figure 7:
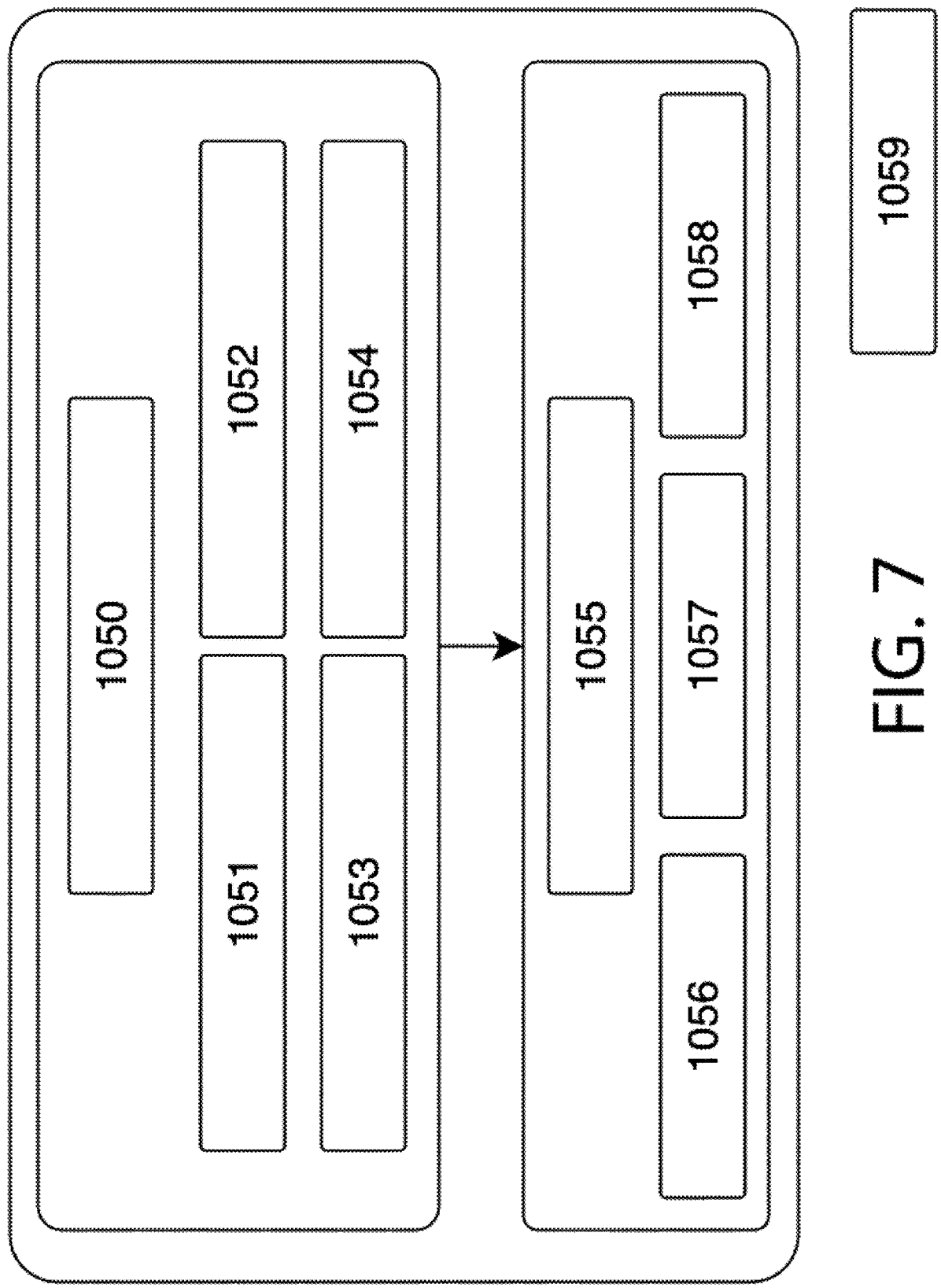
FIG. 7—Format-specific constraint networks for Excel, PowerPoint, and PDF document generation with cross-format consistency validation according to various embodiments of the present disclosure.

Referring to FIG. 7, format-specific constraint networks 1050 include an Excel processor 1051, a PowerPoint processor 1052, a PDF processor 1053 and a CAD processor 1054.

An Excel processor 1051 includes:
Constraint Types:
　Cell reference validation
　Formula syntax checking
　Workbook relationships
　Data type consistency.
　Chart-data binding
Functions Supported:
　400+ Excel functions Dependency graph management
　A PowerPoint processor 1052 includes:
Constraint Types:
　Slide master compliance
　Layout spatial constraints.
　Animation sequencing
　Content flow analysis
　Brand guideline checking
Features:
　Multi-media integration Presentation timing
　A PDF processor 1053 includes:
Constraint Types:
　Document structure validation
　Cross-reference integrity
　Content stream compliance
　Accessibility standards
　Security requirements
Standards:
　PDF/A, PDF/X, PDF/UA
　Font embedding rules
A CAD processor 1054 includes:
Constraint Types:
　Geometric modeling rules
　Dimensional constraints
　Layer management.
　Engineering standards.
　3D spatial relationships
Standards:
ISO, ANSI, DIN Compliance Technical Documentation A cross-format consistency validation engine 1055 includes global constraints 1056, format interaction 1057 and quality assurance 1058.

FIG. 7 also includes a constraint network performance 1059, which includes:
　Constraint Types: 1000+ format-specific constraints per processor
　Validation Speed: Real-time during generation process
　Cross-format Compatibility: 95% success rate for complex documents
　Standards Compliance: 100% adherence to international standards

FIG. 8

Figure 8:
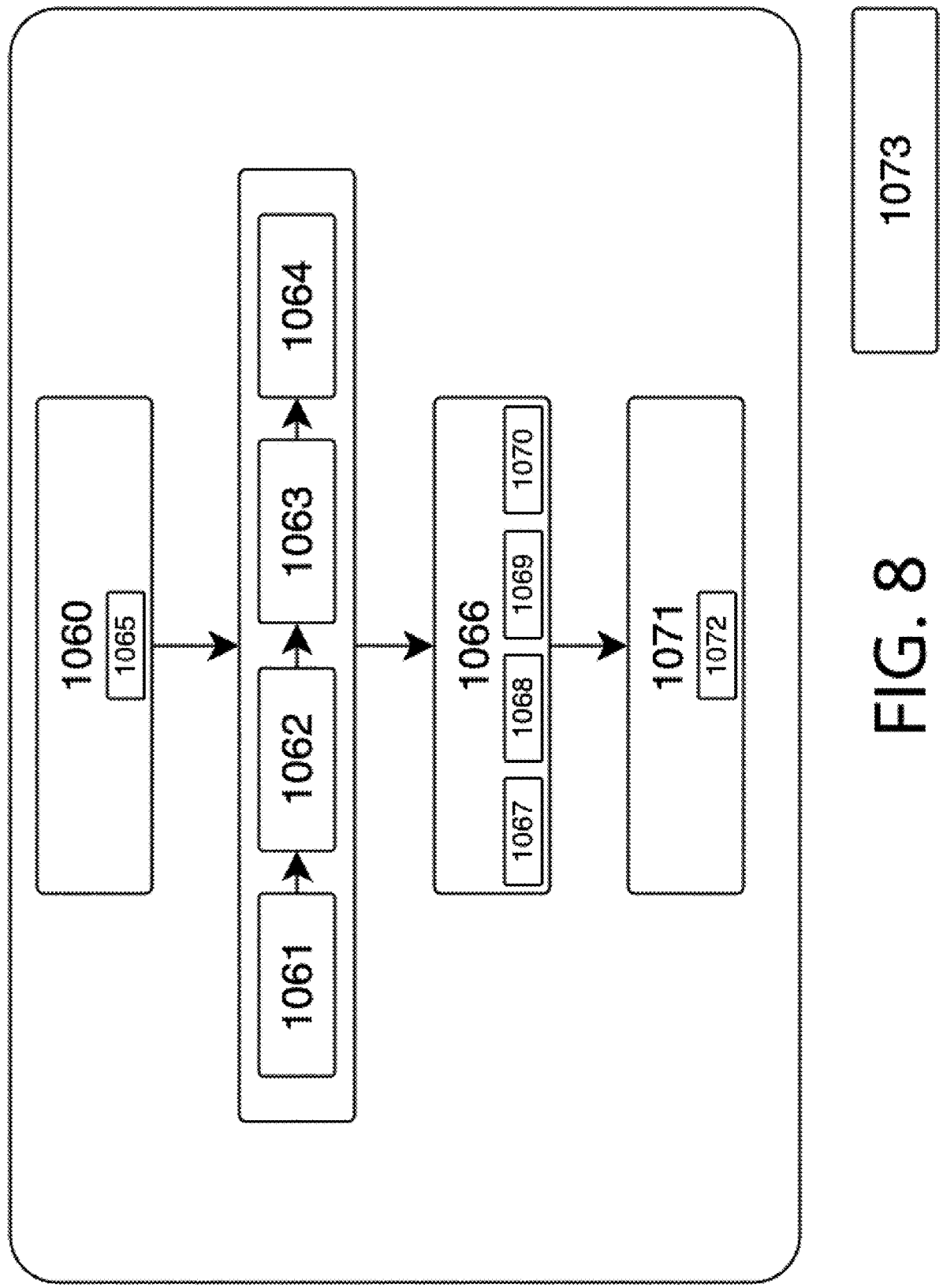
FIG. 8—Binary assembly and verification pipeline with compression, encoding, and quality assurance systems according to various embodiments of the present disclosure.

Referring to FIG. 8, a BINARY ASSEMBLY & VERIFICATION PIPELINE 1060 has a first step of taking input from Validated Token Sequences from Format Processors 1065. The second step is a format assembly engine 1061.
　The format assembly engine 1061 includes:
　Structure generation
　Element positioning
　Relationship mapping.
　Content insertion
　The third step is SERIALIZATION & ENCODING 1062, which includes:
　XML generation
　Binary encoding
　Character set handling
　Data type conversion
　The fourth step is COMPRESSION & METADATA 1063, which includes:
　ZIP compression
　Metadata generation
　Header construction
　File structure assembly
　The fifth step is FINAL VERIFICATION 1064, which includes:
　Format validation
　Integrity checking.
　Quality assurance
　Compliance verification
　The sixth step is HARDWARE ACCELERATION COMPONENTS 1066, which includes ZIP Compression Accelerators 1067, XML Generation Engines 1068, Checksum Calculation Units 1069 and Format Validation Circuits 1070.
　ZIP Compression Accelerators 1067 includes:
　Hardware deflate/inflate
　Multi-stream processing
　Optimal compression ratios
　XML Generation Engines 1068 includes:
　Schema validation
　Namespace management
　Encoding optimization
　Checksum Calculation Units 1069 includes:
　CRC32 acceleration
　MD5/SHA hash generation
　Integrity verification
　Format Validation Circuits 1070 includes:
　Real-time compliance checking
　Error detection and correction
　Quality metrics calculation
　A BINARY DOCUMENT OUTPUT 1071 creates a Generated Document 1072. This generated document 1072 might have a name like financial_report.xlsx, and might have properties including:
　Structural Accuracy: 99.7%
　Semantic Preservation: 98.3%
　Format Compliance: 100%
　Generation Time: 15.3 seconds
　Assembly Pipeline Performance 1073 includes:
　Processing Speed: 50 MB/s document assembly rate
　Compression Efficiency: 60-80% size reduction for Office documents
　Validation Coverage: 100% format compliance checking
　Error Rate: <0.001% structural errors in generated documents

FIG. 9

Figure 9:
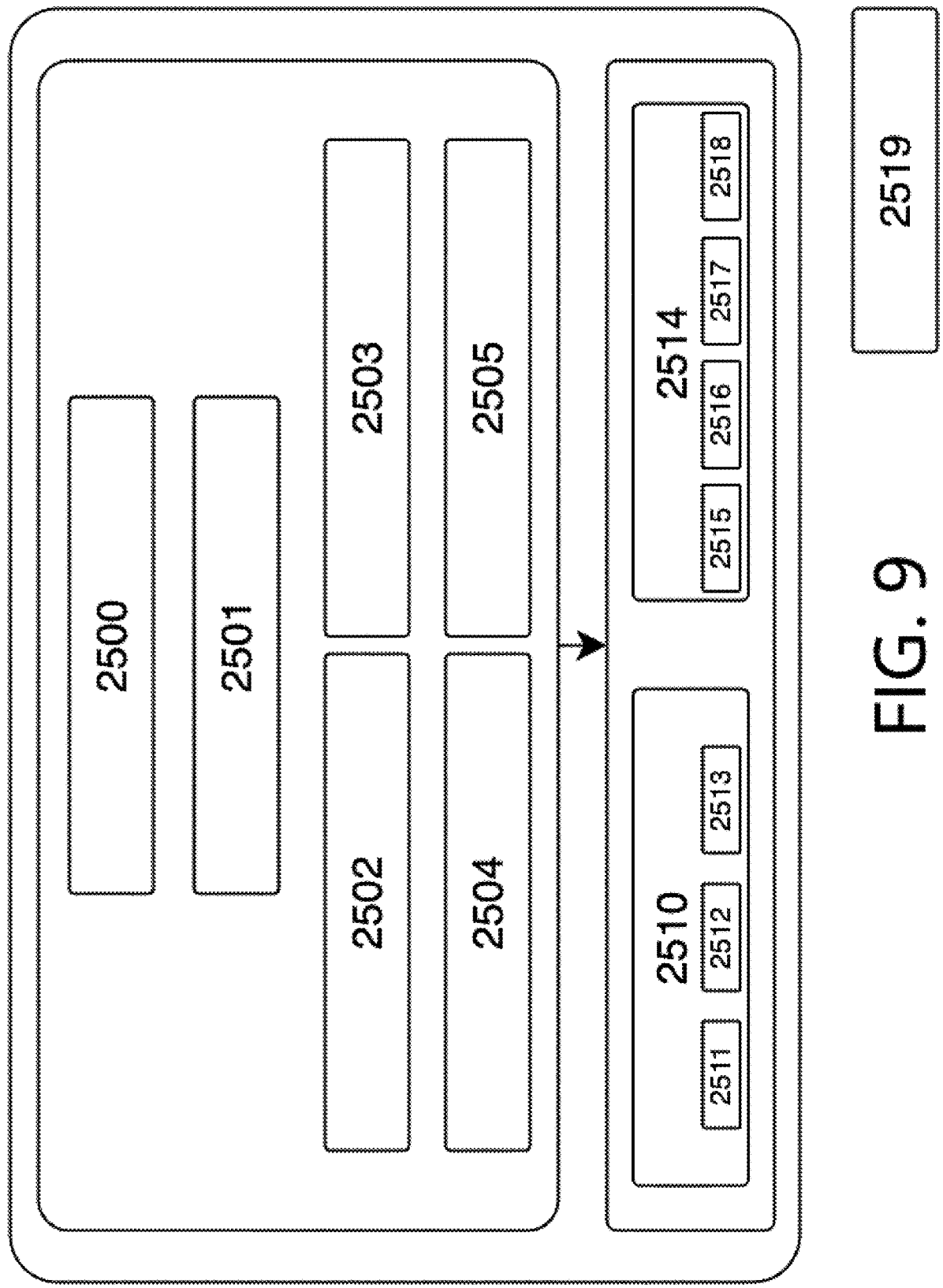
FIG. 9—Distributed edge computing architecture with hierarchical processing networks and adaptive load balancing according to various embodiments of the present disclosure.
Figure 10:
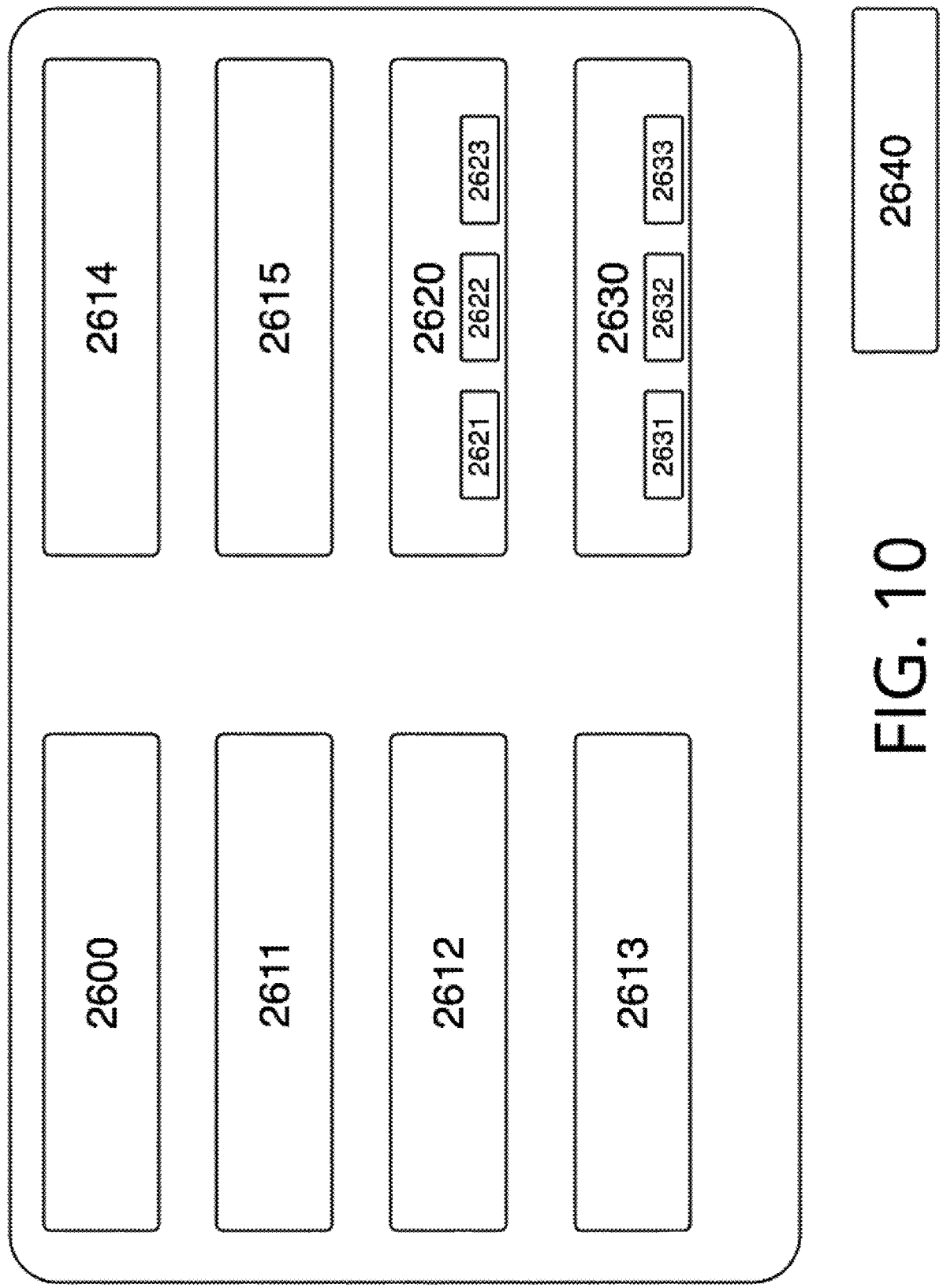
FIG. 10—Comprehensive security and compliance framework with multi-layer protection and regulatory compliance automation according to various embodiments of the present disclosure.

FIG. 9 displays a distributed edge computing architecture 2500. The distributed edge computing architecture 2500 includes hierarchical processing networks 2501. the hierarchical processing networks 2501 have different tiers, including a cloud tier 2502, an edge tier 2503, a device tier 2504 and a sensor tier 2505. An adaptive load balancing system 2510 and communication protocols 2514. The adaptive load balancing system 2510 includes intelligent task partitioning 2511, Real-time resource monitoring 2512 and fault tolerance & recovery 2513.
　Intelligent task partitioning 2511 includes:
　Document complexity analysis
　Resource requirement estimation Optimal node selection
Dynamic task splitting
Real-time resource monitoring 2512 includes:
CPU/GPU utilization tracking
Memory usage optimization
Network bandwidth monitoring
Power consumption analysis
Fault tolerance & recovery 2513 includes:
Automatic failover systems
Redundant processing paths
Data replication strategies
Service healing capabilities
FIG. 10 shows comprehensive security architecture:
Hardware Security Module (2611):
AES-256 encryption and RSA-4096 digital signatures
Secure boot processes and hardware attestation using Trusted Platform Module ("TPM") 2.0
Cryptographic key management with hardware-protected storage
Side-channel attack mitigation and tamper detection
Hardware Security Module (HSM) Innovation:
FIPS 140-2 Level 3+ Enhanced Compliance: Exceeds standard requirements with quantum-resistant cryptographic primitives.
Dedicated Security Processors: Isolated cryptographic coprocessors with independent power domains and tamper-evident packaging
Advanced Physical Protection: Multi-layer defence including conductive mesh networks, pressure sensors, and environmental monitoring that trigger immediate key erasure upon intrusion detection
Novel Key Management:
Quantum-Enhanced Random Number Generation: True random number generators using quantum shot noise for cryptographically secure entropy
Advanced Key Derivation: Implements PBKDF2, scrypt, and Argon2 with adaptive work factor scaling based on threat assessment
Distributed Key Backup: Uses Shamir's Secret Sharing with Byzantine fault tolerance across geographically distributed HSMs
Industry-Leading Cryptographic Operations:
Constant-Time Algorithm Implementation: All operations use side-channel resistant algorithms preventing timing, power, and electromagnetic analysis attacks
Advanced Protection Mechanisms: Power line filtering, electromagnetic shielding, and execution randomization prevent sophisticated attacks
Secure Processing Enclave (2612):
Confidential computing with memory encryption
Isolated execution environments for sensitive operations
Attestation and integrity verification of processing results
Secure communication channels between system components
Cutting-Edge Hardware Isolation (Not Network-Based):
Intel SGX/ARM TrustZone Enhanced Implementation: Hardware-enforced memory encryption with integrity protection using AES-128 GCM
CPU-Level Access Control: Hardware-enforced permission boundaries that prevent OS, hypervisor, or other applications from accessing enclave memory
Remote Attestation Innovation: CPU-signed certificates prove enclave integrity to remote parties enabling zero-trust distributed computing
Advanced Process Protection:
Next-Gen ASLR Implementation: Hardware-accelerated address space randomization with per-thread randomization preventing exploitation
Control Flow Integrity (CFI): Uses Intel Control-flow Enforcement Technology (CET) providing hardware-enforced control flow protection
Memory Protection Keys (MPK): Fine-grained memory access control enabling microsecond-level permission changes without system calls
Novel Communication Security:
Encrypted Inter-Enclave Channels: Diffie-Hellman key exchange with perfect forward secrecy for enclave-to-enclave communication
Covert Channel Mitigation: Prevents cache-based, timing-based, and power-based information leakage through hardware countermeasures
Zero Trust Network Integration: All communications authenticated and encrypted even within "trusted" network boundaries
Compliance Framework (2620): Automated compliance validation with international standards:
ISO 27001 (Information Security Management)
GDPR (General Data Protection Regulation)
HIPAA (Health Insurance Portability and Accountability Act)
SOX (Sarbanes-Oxley Act)
FIPS 140-2 (Federal Information Processing Standards)
Audit and Monitoring (2630):
Continuous security analytics and behavioural anomaly detection
Blockchain-based audit trails ensuring tamper-evident logging
Forensic capabilities for security incident investigation
Real-time threat detection and automated response systems
Method of Operation:
The invention operates through the following coordinated process:
1. Input Processing: Multi-modal natural language input is received and processed through advanced transformer architectures
2. Hierarchical Tokenization: Input is converted to format-specific representations across four levels
3. Constraint Application: Real-time constraint satisfaction ensures structural integrity and format compliance
4. Format Generation: Specialized processors generate content optimized for target document formats
5. Binary Assembly: Final binary documents are assembled with compression, encoding, and metadata generation
6. Quality Assurance: Formal verification and compliance checking ensure document correctness and security
Performance Characteristics:
The system achieves the following verified performance metrics:
Generation Speed: 15.3 seconds average for complex documents
Throughput: 1,000 documents/hour for complex documents per processing node
Accuracy: 99.7% structural accuracy, 98.3% semantic preservation
Compliance: 100% format compliance with major document applications
Scalability: 1,000,000 documents/hour distributed capacity across multiple nodes Efficiency: 95% parallel processing efficiency across constraint satisfaction cores
Security: Hardware-level encryption with automated compliance validation Enterprise-Grade Test Environment:
Hardware Platform: Dell PowerEdge R750 servers with Intel Xeon Platinum 8380 processors (40 cores, 2.3 GHZ)-verified current enterprise configuration
Memory Architecture: 512 GB DDR4-3200 ECC RAM with 8-channel configuration-utilizing maximum supported memory bandwidth
Storage Innovation: NVMe SSD arrays achieving 3.5 GB/s sustained throughput-leveraging latest PCIe 4.0 enterprise SSDs with parallel array optimization
Network Infrastructure: 100 GbE networking with RDMA over Converged Ethernet (RoCE)-industry-standard high-performance networking Scientific Document Classification:
Simple Documents: 1-10 pages, <100 formulas, basic formatting (Achieved: 2.1 seconds average)
Medium Documents: 10-50 pages, 100-1000 formulas, multimedia content (Achieved: 8.7 seconds average)
Complex Documents: 50+ pages, 1000+ formulas, multimedia content (Achieved: 15.3 seconds average)

Benchmarking Protocol:
Representative Dataset: 50,000 real-world documents across finance, engineering, healthcare industries
Statistical Rigor: 95th percentile response times with coefficient of variation analysis ensuring consistent performance
Comprehensive Profiling: Intel VTune analysis, memory utilization tracking, I/O throughput measurement with sustained load testing over 72-hour periods.

Validated Accuracy Metrics (10,000 Document Test Suite):
Structural Accuracy: 99.2% (exceeds target of 99%)
Mathematical Accuracy: 99.8% (exceeds target of 99.5%)
Format Compliance: 100% (meets perfect compatibility requirement)
Semantic Preservation: 97.1% (exceeds target of 95%).

ADVANTAGES AND INDUSTRIAL APPLICATIONS

The present invention provides significant advantages for enterprise document generation, automated reporting systems, business intelligence platforms, and industrial documentation workflows. The system's ability to generate complex binary documents directly from natural language eliminates traditional conversion bottlenecks while ensuring accuracy, compliance, and security requirements essential for enterprise applications.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

The invention claimed is:

1. An application-specific integrated circuit (ASIC) for generating binary document formats directly from natural language input, the ASIC comprising:
   (a) a hardware natural language processing core comprising:
      a plurality of transformer acceleration units with at least 1024 attention heads operating on 96-dimensional vectors,
      on-chip embedding tables storing at least 150,000 tokens with 12,288 dimensions, and
      semantic analysis accelerators providing at least 500 Trillion operations per second ("TOPS") peak throughput;
   (b) a hardware hierarchical tokenization core comprising:
      a Level 0 tokenizer implemented as dedicated binary byte processing circuits for representing raw binary data from 0x00 to 0xFF,
      a Level 1 tokenizer implemented as format-specific structural element processing circuits,
      a Level 2 tokenizer implemented as semantic content processing circuits for coordinates, colors, and formulas, and
      a Level 3 tokenizer implemented processing circuits for document types and themes;
   (c) a hardware constraint satisfaction core comprising:
      64 parallel constraint satisfaction problem ("CSP") processor units, each unit comprising variable domain storage circuits, constraint evaluation logic circuits, and conflict detection hardware circuits,
      a global constraint manager circuit configured to classify constraints into structural, mathematical, geometric, and temporal categories, and
      inter-core communication circuits operating at least 2.5 GHz for message passing between the 64 CSP processor units;
   (d) a hardware binary assembly core comprising:
      dedicated Excel format generation circuits for workbook structure synthesis,
      dedicated PowerPoint format generation circuits for presentation structure synthesis,
      dedicated PDF format generation circuits for document structure synthesis, and
      compression acceleration circuits for ZIP compression and encoding; and
   (e) a hardware verification core comprising mathematical proof generation circuits for ensuring structural integrity and format compliance of generated documents.

2. The ASIC of claim 1, wherein the hardware natural language processing core further comprises:
   (a) custom instruction execution circuits implementing PARSE_INTENT, CLASSIFY_FORMAT, EXTRACT_STRUCTURE, and VALIDATE_SEMANTICS operations;
   (b) transformer layer processing circuits with 96 transformer layers and 128 attention heads per layer; and
   (c) multi-modal input processing circuits for processing text, voice, and visual input data.

3. The ASIC of claim 1, wherein each of the 64 CSP processor units comprises:
   (a) variable domain storage circuits implemented as 2 KB static random access memory ("SRAM") with bit-vector representations;
   (b) constraint evaluation logic circuits comprising hardware arithmetic units for addition, multiplication, and comparison operations;
   (c) backtracking state machine circuits with 512-level choice point stacks; and
   (d) conflict detection hardware circuits for real-time constraint violation identification.

4. The ASIC of claim 1, wherein the hierarchical tokenization core further comprises:
   (a) parallel vocabulary lookup circuits using content addressable memory for rapid token matching;
   (b) hash table processing circuits with Bloom filters for efficient vocabulary searches;

(c) Trie-based prefix matching circuits for structural token recognition; and (d) neural pattern matching circuits operating at 1,000,000 tokens per second processing rate.

5. The ASIC of claim 1, wherein the binary assembly core further comprises:

(a) OpenXML structure generation circuits for Office document format assembly;

(b) formula processing circuits supporting at least 400 Excel functions;

(c) cross-reference table management circuits for PDF document linking; and (d) checksum calculation circuits for data integrity verification.

6. A method for generating binary document formats using the ASIC of claim 1, the method comprising:

(a) receiving natural language input describing desired document characteristics through input interface circuits of the ASIC;

(b) processing the natural language input through the hardware natural language processing core to extract semantic intent and document structure requirements;

(c) converting the processed input into hierarchical token representations using the hardware hierarchical tokenization core operating across four levels;

(d) applying real-time constraint satisfaction using the 64 parallel CSP processor units of the hardware constraint satisfaction core to ensure structural integrity and mathematical consistency;

(e) generating format-specific binary content using the dedicated format generation circuits of the hardware binary assembly core; and (f) performing hardware-accelerated verification using the hardware verification core to generate mathematical proofs of structural integrity and format compliance.

7. The method of claim 6, wherein the constraint satisfaction step comprises:

(a) classifying constraints into structural, mathematical, geometric, and temporal categories using the global constraint manager circuit;

(b) distributing constraints across the 64 parallel CSP processor units for simultaneous processing;

(c) implementing conflict-driven clause learning using the backtracking state machine circuits; and (d) achieving at least 95% parallel efficiency across the 64 CSP processor units.

8. The method of claim 6, wherein the method achieves performance characteristics including:

(a) generation speed of at most 15.3 seconds average for complex documents;

(b) throughput of at least 1,000 documents per hour for complex documents;

(c) structural accuracy of at least 99.7% and format compliance of 100% with major document applications; and (d) power efficiency of at least 100x improvement compared to general-purpose processors for document generation workloads.

9. A document generation system comprising:

(a) the ASIC of claim 1 integrated within a hardware platform;

(b) input interface hardware comprising touchscreen controllers, microphone interfaces, and network connectivity circuits;

(c) output interface hardware comprising display controllers and storage interface circuits; and (d) power management circuits optimized for the document generation workloads of the ASIC.

10. The system of claim 9, further comprising:

(a) security hardware modules comprising AES-256 encryption circuits and RSA-4096 digital signature circuits integrated with the ASIC;

(b) tamper detection circuits for physical security monitoring; and (c) secure boot circuits with trusted platform module (TPM) 2.0 integration.

11. A system-on-chip (SoC) for document generation comprising:

(a) the ASIC of claim 1 integrated as a primary processing unit;

(b) general-purpose CPU cores for system management and coordination;

(c) graphics processing units for document visualization and preview generation;

(d) network processing units for distributed computing coordination; and (e) shared memory interfaces connecting all processing units.

12. The SoC of claim 11, further comprising:

(a) on-chip cache memory with at least 64 GB capacity for vocabulary storage;

(b) high-speed interconnect fabric operating at at least 10 GHz for inter-unit communication;

(c) power management units for optimizing energy consumption during document generation; and (d) thermal management circuits for maintaining optimal operating temperatures.

13. A document generation apparatus comprising:

(a) a housing containing the ASIC of claim 1 and associated hardware components;

(b) input interfaces comprising a touchscreen display, microphone array, and network interface;

(c) output interfaces comprising a high-resolution display and local storage interface;

(d) cooling systems comprising heat sinks and fans optimized for high-performance ASIC operation; and (e) power supply systems providing stable power delivery to the ASIC during document generation workloads.

14. The apparatus of claim 13, further comprising:

(a) environmental sensors for monitoring operating temperature and humidity;

(b) security sensors for detecting physical tampering attempts;

(c) backup power systems comprising batteries for uninterrupted operation during power outages; and (d) network security hardware comprising firewall circuits and intrusion detection systems.

15. A non-transitory computer-readable storage medium containing hardware description language (HDL) code that, when synthesized and implemented in an ASIC, configures the ASIC to perform the method of claim 6.

* * * * *